UNITED STATES PATENT OFFICE.

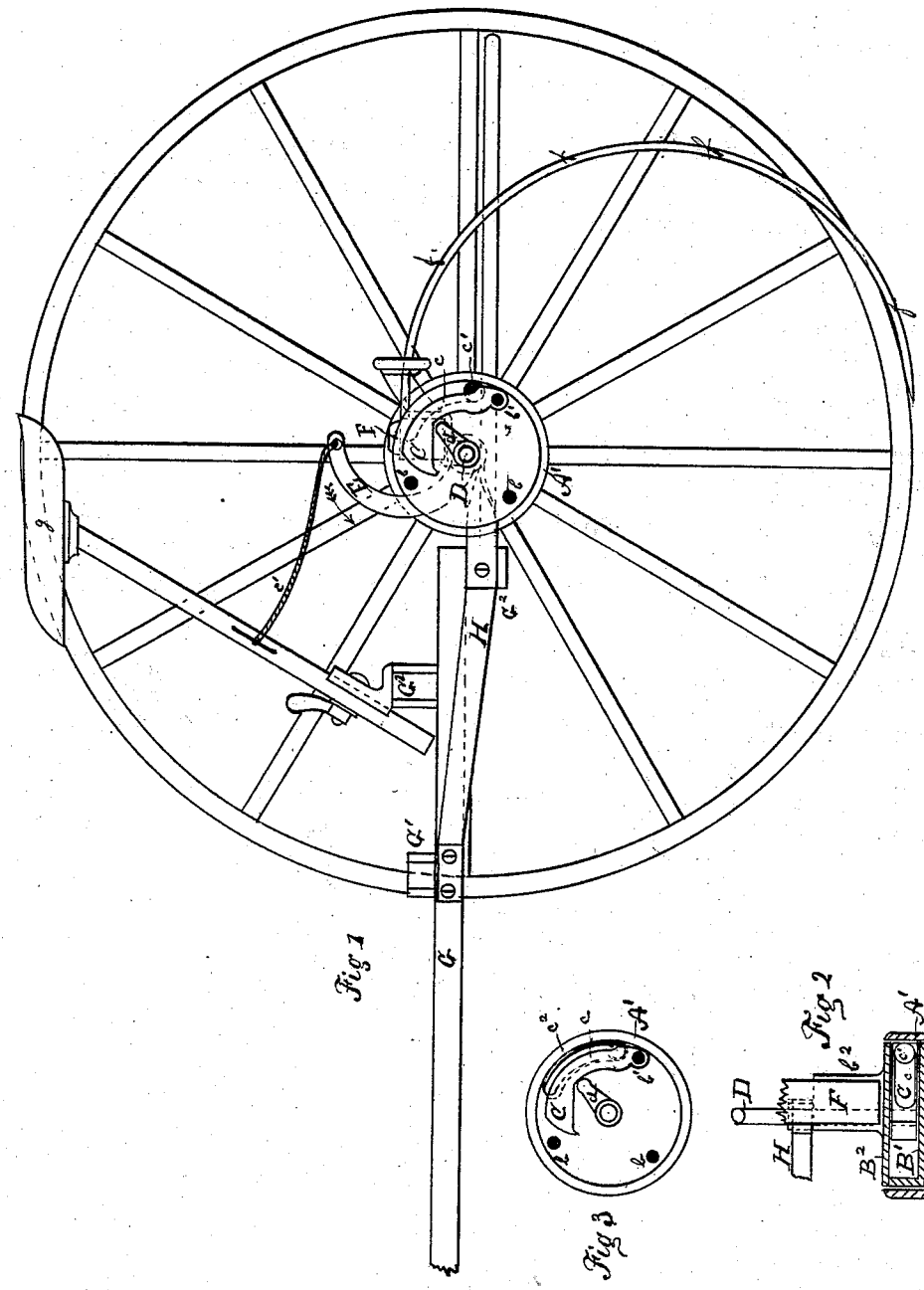

JOHN J. SQUIRE, OF ST. LOUIS, MISSOURI, ASSIGNOR TO L. M. RUMSEY AND MOSES RUMSEY, OF SAME PLACE.

IMPROVEMENT IN HORSE HAY-RAKES.

Specification forming part of Letters Patent No. 207,217, dated August 20, 1878; application filed July 19, 1878.

*To all whom it may concern:*

Be it known that I, JOHN J. SQUIRE, a resident of St. Louis, Missouri, have invented a new and useful Improvement in Horse-Rakes, of which the following is a full, clear, and exact description, reference being had to the annexed drawing, making a part of this specification, in which—

Figure 1 is a side elevation with one of the wheels removed to more clearly show the hub-connections, in which this improvement mainly consists. Fig. 2 is a sectional plan of the same; and Fig. 3, a side elevation, showing a modification of the same improvement.

The same letters of reference denote the same parts.

This improvement has reference more particularly to that class of horse-rakes known as "self dumping or discharging," in which the dumping mechanism is attached to the hubs of the wheels, under the control of the attendant or driver.

The object of this invention is to improve the construction of the mechanism connecting the wheels with the rake-head, so that the same will operate simultaneously and equalize the draft on the horse, as also, in a measure, to simplify and cheapen the construction.

The invention consists of a horse hay-rake constructed with a wheel-hub, A, having an annular rim, A', on its inside, and a suitable box for the axle B. The axle B has attached to it a cylindrical box, made in two parts, $B^1$ and $B^2$, and secured together by screws or bolts $b$ $b$ $b^1$, which, when completed, will work freely within the annular rim A'. Attached to and within the cylindrical box $B^1$ and $B^2$ is a pawl, C, pivoted at one end, and made to swing upon one of the screws $b^1$. The pawl C is made on one face to conform to the inner diameter of the annular rim A', and provided with a recess or groove, $c$. In groove $c$ is placed a friction pad, roller, or ball, $c^1$, preferably of some elastic material, as hard rubber, or a spring, $c^2$, suitably formed, as shown at Fig. 3. On the one face the pawl is of irregular or cam outline.

Centrally with the axle B a rod, D, passes through $B^2$, and extends the whole width of the rake parallel with the rake-head. At each end of rod D, and within the cylindrical box $B^1$ $B^2$, is a crank, $d$, which supports the pawl C, and works against its cam-face to raise or lower it. At any suitable point on the rod D is a lever, E, firmly secured to the same by set-screws, or any equivalent device, in a position relatively to the cranks $d$ $d$. At the opposite end of lever E a strap, cord, or rod, $e$, is attached, and placed conveniently to the driver or attendant, so that with his foot or hand he can throw the lever E, and with it the cranks $d$ $d$, at the same time and simultaneously with each other.

$B^2$ is provided with a bracket, $b^2$, to which the rake-head F is secured, and which rake-head F determines the width of the rake. Attached to the rake-head F are teeth $f$ $f$ $f$ $f$, suitably curved for the purpose, and made to act independently of each other on principles well known.

G are shafts, arranged in the ordinary manner, upon which is mounted an adjustable seat, $g$, for the driver. Shafts G are provided with cross-bars $G^1$ $G^2$ and hinged straps H. The hinged straps H serve to connect the shafts G with the bracket $b^2$, through which the crank-rod D passes, serving as a fulcrum for the revolving of the rake. The rear cross-bar, $G^2$, serves as a stop to arrest the revolving of the rake by throwing back the lever E to its original position, carrying the rod D and cranks $d$ $d$ with it, thus releasing the pawl C and friction roller or pad $c^1$ $c^2$, allowing the rake, by its own weight, to fall again to its work.

The operation is as follows, viz: As soon as the driver or attendant shall find his rake full or ready to be relieved of its load, he throws the lever E in the direction of the arrow. This rotates the rod D, and with it the cranks $d$ $d$. The cranks $d$ $d$ simultaneously lift the pawls C, and the friction pad or roller $c^1$ is pressed in contact with the inner portion of the annular rim A' attached to the hubs A of the wheels, which locks the wheels and rake together, and, as the wheels revolve by the draft of the horse, the rake is lifted and its load discharged. At this juncture the lever E is arrested by the cross-bar $G^2$, thrown back to its original position, and the rake in consequence falls again to its work.

I prefer to use the clutch mechanism shown and described in connection with the wheels and head of a horse-rake; but I believe the same to be novel independently thereof, and as well adapted for other uses, and I shall therefore make it the subject of a separate application.

I claim—

1. In combination with the wheel-hub and its annular rim, the friction-brake, having cam-surface, the rock-shaft and its crank, and the oscillating axle or rake-head, substantially as described.

2. The friction-brake, grooved to receive a roller on the upper or contact surface and having a cam-outline on the lower surface, in combination with mechanism for actuating it through said cam, and with the rake-head and wheel-hubs of a horse hay-rake.

3. In combination with the oscillating axle B, wheel-hub A, and annular rim A$'$, the cylinder-box B$^1$ B$^2$, friction-brake, with cam-surface, rock-shaft E, with its crank and suitable lever attachment.

JOHN J. SQUIRE.

Witnesses:
M. RUMSEY,
L. M. RUMSEY.